United States Patent Office 3,639,358
Patented Feb. 1, 1972

3,639,358
METHOD OF PREPARING AROMATIC
POLYAMIDES
Gus Nichols, Baltimore, Md.
(622 Pierce Ave., Apt. 6, Fort Wayne, Ind. 46807)
No Drawing. Filed June 28, 1968, Ser. No. 741,209
Int. Cl. C08g 20/20
U.S. Cl. 260—78 R
18 Claims

ABSTRACT OF THE DISCLOSURE

Preparation of fiber forming polyarylene amides by reacting
(1) N-aliphatic acyl amino carboxylic-aliphatic anhydride or by reacting
(2) an arylene dicarboxylic acid-dialiphatic acid anhydride with
(3) an arylene diamine N,N'-aliphatic diacylate.

BACKGROUND OF THE INVENTION

For a number of years textile fibers have been prepared from various polyamide compositions. These fibers are generally characterized by high tenacity, good stability to hydrolysis and suitable dyeability. For certain uses, however, the thermal characteristics of these fibers are not acceptable.

For example, the polyamides derived from alkylene diamines and alkanedioic acids, such as those described in U.S. Pat. 2,130,948, degrade rapidly in air at temperatures as low as 200° C. and lose a considerable part of their strength at temperatures much lower than their melting points. Polyamides prepared from arylene diamines and alkanedioic acids soften at temperatures much lower than their melting points, and in addition have an undesirable amber coloration which makes them unsuitable for many uses.

Polyarylene amides have been prepared in the past from (a) the polycondensation reaction of hydrochloric acid salts of amino-aroyl chlorides by the elimination of two moles of gaseous hydrochloric acid per polymer unit, or (b) the interaction of arylene di(chloroformyl) with arylene diamines by the elimination of gaseous hydrochloric acid.

These reactions are carried out either (1) by the interfacial method in a high speed Waring "Blendor" using as an organic phase tetrahydrofuran, while the second, preferably aqueous, phase contains an organic or mineral agent combining with acids suitable for initiating and assuring the continuity of the polymerization reaction, or (2) in a solvent system consisting preferably of N,N-dimethyl acetamide and lithium or calcium chloride. In place of N,N-dimethyl acetamide it is possible to use hexamethyl phosphoramide or N-methylpyrrolidone. Moreover, while it is convenient to prepare these polymers by using a single organic solvent as the polymerization medium at a low temperature, it is also possible to work in a medium comprising two solvents.

Theoretically, any arylene dichloroformyl and any arylene diamine or their various derivatives can be used in the preparation of polyarylene amides. However, in practice a number of limitations exist with respect to softening points and solubility. Any decrease of the amidic hydrogen atoms by substitution diminishes the hydrogen bonding, and as a result the crystallinity of the polymer molecule decreases. Alkyl substitution of the nuclear hydrogen atoms lowers the softening point of the polymer molecule and increases its solubility and sensitivity toward oxidation.

The simplest polyarylene amides are those derived from the hydrochloric salts of amino benzoyl chloride. The well-known strong chemical affinity of the free amino group toward the benzoyl chloride group in a single molecule, as in the case of amino benzoyl chlorides, does not permit their co-existence in that form, and accordingly the amino benzoyl chloride must be in the form of an inorganic salt.

In order to utilize a polyamide as a fiber, a minimum average polymer molecular weight of 15,000 is desirable. This molecular weight cannot be achieved by the condensation of a hydrochloric acid salt of orthoamino benzoyl chloride through elimination of two molecules of gaseous hydrochloric acid per mole of the hydrochloric acid salt of the ortho-amino benzoyl chloride, because the ortho position favors intrapolymerization and yields cyclic polymers having a molecular weight below 20,000. On the other hand, the hydrochloric acid salt of para-amino benzoyl chloride can yield aromatic polyamide having an average molecular weight well above 20,000.

Unfortunately these para-polymers are insoluble in the solvent system N,N-dimethyl acetamide-lithium chloride, and no other solvent has yet been found for them. Accordingly, the para-polyamide benzamides are useless for wet spinning in solvent systems, and they are also useless for melt-spinning because they do not have a melting point.

In polyarylene amides decomposition occurs slightly below their softening points which are well above 450° C. This is due to higher crystallinity resulting from the strong hydrogen bonding which tightens up the polymer units and also tends to raise their softening points. The hydrochloriic acid salt of meta-amino benzoyl chloride yields polymers combining an average molecular weight well above 15,000 with high solubility in the solvent system, N-N-dimethyl acetamide-lithium chloride, and they are useful for temperature-resistant synthetic fibers, etc. Therefore, the utilization of polyarylene amides is a function of the substituents' position on the ring. The meta-position is of practical importance for polyarylene amides containing one benzene ring. Other known polyarylene amides have been prepared from the following arylene di(chloroformyl)s: isophthaloyl chloride, p,p'-bibenzoyl chloride, 1,6-naphthoyl chloride, terephthaloyl chloride, orthophthaloyl chloride, and their various substituted or unsubstituted derivatives; and from the following arylene diamines: metaphenylene diamine, paraphenylene diamine, p,p'-bisphenylene diamine, 1.6-naphthalene diamine, m,m'-phenylene bis-benzamide diamine, bis-meta-phenylene diamine isophthalamide, and their various substituted or unsubstituted position isomers and derivatives. Considering the class of arylene di(chloroformyl)s for this type of reaction, extreme purity of these compounds (99.9% or better) is required. This purity is almost impossible to obtain because of the high chemical reactivity of arylene di(chloroformyl)s, as exemplified by their tendency to react even with humid air. Therefore, freshly distilled arylene di(chloroformyl)s free from any impurities are used. By the same token, arylene diamines should also be extremely pure (99.9% or better). Furthermore, these compounds are very sensitive to light, which oxidizes them, and to moisture. So in such preparation of polyarylene amides, both components (the arylene di(chloroformyl)s and arylene diamines) should be free of any impurities and freshly distilled.

Furthermore, the solvent system N,N-dimethyl acetamide should be free from any impurities and the water content should not exceed to 10 p.p.m.

THE INVENTION

The invention comprises the novel compositions and component mixtures comprised in such compositions, as well as the novel processes and steps of processes according to which such compositions may be manufactured, specific embodiments of which are described hereinafter by way of example only and in accordance with what is now considered the preferred manner of practicing the invention.

Briefly, the process of this invention involves the reaction of (A) an aromatic halo group or the alkanoyl derivative of an aromatic acid or of an aromatic hydroxyl group with (B) an alkanoyl derivative of an aromatic amino, an aromatic hydroxyl, an aromatic thio or, when (A) is a halo group, an aromatic carboxyl group to eliminate acyl material and form an aromatic polymer. Thus, an aromatic ring moiety such as

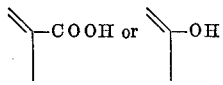

is reacted with an acylating agent to form, respectively, an alkanoyl derivative represented as follows:

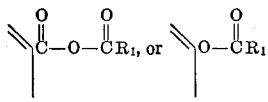

and a second moiety such as

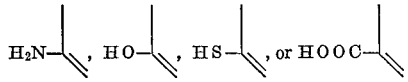

is similarly reacted to obtain, respectively, alkanoyl derivatives represented as follows:

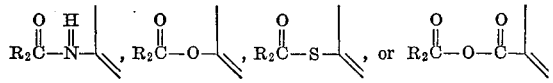

wherein $R_1$ and $R_2$ are alkyl groups, preferably lower alkyl groups, as further described hereinafter. The first alkanoyl moiety of the aromatic halo moiety is then reacted with the second moiety to eliminate an acyl material, as further described hereinafter, and thereby form the all-aromatic or polyarylene polymers of this invention.

Thus, haloarylenes or alkanoyl derivatives of arylene carboxylic acids or arylene hydroxyl groups are reacted with alkanoyl derivatives of arylene hydroxyl, arylene amine, arylene thio, or (with the haloarylene) arylene carboxyl groups to eliminate acylic material and form the arylene polymer. When arylene carboxylic acid is used, the alkanoyl derivative is a mixed anhydride of the arylene carboxylic aicd and the alkanoic acid; when a hydroxy arylene is used, the derivative is the arylene alkanoate; when an arylene amine is used, the derivative is an arylene amine N-alkanoate; and when a thio arylene is used, the derivative is an arylene thiol S-alkanoate. The alkanoyl derivative is formed in each instance by reacting the particular substituted arylene with sufficient acylating agent, as hereinafter more fully described.

According to the present invention, reaction of the alkanoyl derivative of arylene carboxylate with an amino, hydroxy, or thio arylene derivative forms, respectively, an aromatic nylon, an aromatic polycarbonate or an aromatic polythiocarbonate; reaction of the alkanoyl derivative of hydroxy arylene with the alkanyl derivative of an amino, hydroxy, or thio arylene forms, respectively a secondary aromatic polyamine, an aromatic polyether, or an aromatic polysulfide; and reaction of the haloarylene with the alkanoyl derivative of an amino, hydroxy, thio, or carboxyl arylene forms, respectively, a secondary aromatic polyamine, an aromatic polyether, an aromatic polysulfide, or an aromatic polycarbonate. It will be appreciated that the substituents in a given arylene can either be the same or different and that if the substituents are different, one substituent must be of one reactant group and the other substituent must be of another group which will react with the first. For example, to form an aromatic nylon polymer or poly-arylene amide, the reaction will involve the alkanoyl derivative of a carboxylate and the alkanoyl derivative of an amine, and the starting materials used to produce the alkanoyl derivatives which are reacted to produce the polymers can either be (1) an amino arylene carboxylic acid or (2) arylene diamine and arylene dicarboxylic acid. Correspondingly, either a single mixed arylene material or two arylenes substituted with the same group can be utilized to provide the aromatic polycarbonate, secondary polyamine, polyether, polythiocarbonate, or polysulfide. Similarly, the arylene can be two or more mono- or polynuclear aromatic rings which are joined, e.g. biphenyl, and the arylene rings can be the same or different.

Accordingly, this invention removes all the above-mentioned difficulties of the prior art by using components that are not sensitive to moisture and light and which are not required to be freshly distilled. This invention also provides novel methods of preparing arylene polyamides, arylene polycarbonates, arylene secondary polyamines, aromatic polyethers, arylene polythiocarbonates, and arylene polysulfides, in the form of homopolymers, copolymers, terpolymers and their structural admixtures in any possible way. This reaction proceeds by the formation of the alkanoyl derivatives, which are isolated and subsequently reacted, or further condensed in situ, to yield the desired polymers and polymer molecular weight.

The alkanoyl derivatives for use in the practice of this invention are acylating agents capable of forming anhydrides with an arylene carboxylic acid group. Such agents include anhydrides, acyl halides, and ketones. The lower alkanoic acid anhydrides, lower acyl halides, and lower ketones are especially preferred in the practice of this invention, so that $R_1$ and $R_2$ in the foregoing formulas are alkyl groups containing from one to six carbon atoms. Since the preferred alkanoyl derivatives contain two carbon atoms in the alkanoyl group, the desirable acylating agents are accordingly acetic anhydride, acetyl chloride, and ketone. These lower alkanoyl derivatives are preferred because they have the lowest boiling points of any members of their groups, are more readily available, and are more easily recoverable. The preferred acyl halide is the chloride.

It will be appreciated from the foregoing description that $R_1$ and $R_2$ can be the same or different. Since the two-carbon acylating agents are preferable, the process is most conveniently carried on when $R_1$ and $R_2$ are methyl. Further description of the present invention will be largely in terms of the use of anhydride as acylating agent, but it will be understood that the alkanoyl derivatives can also be formed with acyl halide or ketone as aforesaid.

When mixed anhydrides of arylene and alkanoic acids are referred to, they are designated as mixed anhydrides wherein the two acids are separated by a hyphen. For example, the acetic anhydride derivative of amino-benzoic acid is denominated "aminobenzoic-acetic anhydride" and the acetic anhydride derivative of phthalic (benzene dicarboxylic) acid is "phthalic-acetic dianhydride."

The arylene materials used in this invention can be benzene, naphthalene, anthracene, and other fused polynuclear aromatic hydrocarbons, as well as ring assemblies such as biphenyl, binaphthyl, quaterphenyl, and the like. As described further hereinbelow, the arylene ring can also be derived from substituted mono- or polynuclear aromatic hydrocarbons, e.g., nitrobenzene. The invention is principally described in terms of arylene materials, but heterocyclic and alicyclic rings, both mono- and polynuclear can also be used in this invention as equivalent to the arylenes. For simplicity hereinafter, the invention will be illustrated and discussed largely in terms of the simplest aromatic hydrocarbon, benzene, but it will be understood that this is by way of illustration only and that a variety of other cyclic materials can be utilized.

Polyarylene amides have been prepared in the past, as it was stated previously, from aromatic diacetyl chlorides and aromatic diamines, either by the interfacial method in a high speed Waring "Blendor" or in a solvent system by using exact molecular equivalents of both aromatic diacetyl chloride and aromatic diamine at $-20°$ C. for between 30 minutes and 3 hours at room temperature. In the present method instead of isophthaloyl chloride, the mixed isophthalic-acetic dianhydride is used and this is readily prepared by the interaction of isophthalic acid and acetic anhydride. The formation of the mixed isophthalic-acetic dianhydride can be done either separately or in situ.

Instead of the hydrochloride or m-amino-benzoyl chloride, the mixed m-N-acetyl amino benzoic-acetic anhydride is used, and similarly, instead of aromatic diamines, the diacetyl diamines are used. The whole reaction proceeds as follows: Equivalent molecular quantities of mixed isophthalic-acetic dianhydride and aromatic diacetyl diamine are heated together at above 140° C. in an inert atmosphere of nitrogen or carbon dioxide, and a splitting off of acetic anhydride takes place as follows: The acetate group of the mixed isophthalic-acetic dianhydride splits off and combines with the neighboring acetyl group of diacetyl amine to eliminate acetic anhydride and form an amidic bond. The splitting off of acetic anhydride continues upon raising the temperature and therefore the molecular weight of the polymer is increased. At high temperatures the acetic anhydride in the presence of acetate and acetyl terminal groups of the polymer molecule acts like a plasticizer to keep the polyamide in a very viscous condition, but still in a fluid state, so that stirring of the mass is possible.

The molecular weight obtained in the polymer is a function of temperature, the individual components, and their positions on the benzene rings. It is also possible to use an inert high boiling liquid as a diluent or vehicle, and such materials as decahydronaphthalene, tetrahydronaphthalene, alkanoxy derivatives of biphenyl, biphenyl ethers and other diluents which are inert toward anhydrides can be used.

The only structural difference between the arylene polymers prepared according to this invention and those prepared by conventional methods lies in the terminal groups. The prior art polymers terminate in amino or acetyl chloride groups, whereas the present arylene polymers are terminated in a mixed acetic anhydride group or acetyl amine group. These terminal groups do not interfere with the properties of the arylene polymer. Moreover, the acetate or acetyl terminal groups are more stable than acyl chloride or aniline.

Taking the production of polyarylene amide as an example, the overall reaction in the present method is between an arylene dibasic acid and an arylene diamine, while the acetic anhydride plays a role in the formation of the intermediate derivatives of the dibasic acid and the diamine. During the polymerization reaction the acetic anhydride splits off, and it can be recycled again. Therefore, there is no loss of acetic anhydride and the economics of this polymerization are essentially based on aromatic dibasic acids and aromatic diamines (or on the amino carboxylic acids when both functional groups are on the same ring).

In contrast to the sensitive and highly reactive acetyl chloride groups, the mixed aromatic acid-acetic anhydride groups are less sensitive, less reactive, and more stable, so that purification difficulties are practically obviated. Comparing the stability or light sensitivity of aromatic amine groups with the corresponding aromatic acetyl amine groups, the latter are very stable and insensitive to light, and their preparation is more economical.

Past attempts to prepare the polyaryleneamides directly from aromatic dibasic acids and aromatic diamines with or without catalysts, such as phosphorous acids and other dehydrating agents have failed. The failure is attributable to the fact that the aromatic dibasic acids the acidity is very much weakened. Also the basicity of aromatic diamines has been significantly diminished. Therefore, a salt formation between the aromatic dibasic acids and aromatic diamines does not occur, as it does with the alkanoyl derivatives according to the present method.

This comprises an important difference between aromatic dibasic acids and diamines compared to aliphatic dibasic acids and diamines in the direct method. The present method makes possible the use of acetyl and acetate derivatives. This method is novel and most advantageous in practice, since common, low priced, and readily available raw materials are used to obtain polyarylene amides (aromatic nylons).

Wholly aromatic polyamides provided by this invention comprises the reaction product (I) of a poly-condensation reaction of amino-N-acetyl benzoic-acetic anhydride and/or (II) a polycondensation reaction of (a) a mixed aromatic acid-acetic dianhydride or substituted derivatives thereof and (b) an aromatic diacetyl diamine or substituted derivatives thereof. The amino-benzoic-acetic anhydride derivatives which can be used include mixed ortho-N-acetyl amino benzoic-acetate anhydride, mixed para-N-acetyl amino benzoic-acetic anhydride, and preferably the mixed meta-N-acetyl amino benzoic-acetic anhydride.

In addition to mixed unsubstituted amino-N-acetyl benzoic-acetic anhydride there can be utilized mixed substituted amino-N-acetyl benzoic-acetic anhydride. The substituents should be inert with respect to entering into the reaction and should not be amino or alkyl groups. Substituents which may be present are aryloxy, alkanoxy, and nitro groups.

The type of polycondensation polymer produced by reaction (II), above, can be considered as a projected caprolactam type. Therefore, they can be named as "super nylons" by using only one number.

Examples of mixed aromatic acid-acetic dianhydrides or substituted derivatives are phthalic-acetic dianhydride, terephthalic-acetic dianhydride, and isophthalic-acetic dianhydride, the last being preferred. In addition, their monophenoxy or dialkanoxy, trialkanoxy, tetraalkanoxy, or nitro derivatives can be used. These substituted or unsubstituted mixed aromatic alkanoic dianhydrides constitute the monocyclic aromatic category. Furthermore, mixed biphenyl carboxylic acid-acetic dianhydrides, the mixed naphthoic-acetic dianhydrides and their various derivatives having two benzene rings connected or fused together are used. In addition, heterocyclic or alicyclic nuclei can be included between the aromatic rings, or as terminators in the form of acid-alkanoate dianhydrides.

Examples of aromatic diacetyl diamines are ortho-phenylene N,N'-diacetyl diamine, para-phenylene-N,N'-diacetyl diamine, and meta-phenylene-N,N'-diacetyl diamine, this last being preferred. In addition their derivatives such as the hexahydro-phenylene-N,N'-diacetyl diamine and ortho-, meta-, and para-phenylene-N,N'-diacetyl diamines are useful.

In addition, assemblies of two aromatic rings substituted with N-acetyl amine can be used, and examples of such compounds are p,p' - bisphenyl - N,N' - diacetyl diamine, m,m'-bisphenyl-N,N'-diacetyl diamine, o,o'-bisphenyl-N,N'-diacetyl diamine and their various substituted or unsubstituted derivatives. Furthermore, compounds of two benzene rings fused together are also utilized, and such compounds are 1,6-naphthoyl-N,N'-diacetyl diamine,
1,3-naphthoyl-N,N'-diacetyl diamine,
1,4-naphthoyl-N,N'-diacetyl diamine,
1,5-naphthoyl-N,N'-diacetyl diamine, 1,7-naphthoyl-N,N'-diacetyl diamine,
1,8-naphthoyl-N,N'-diacetyl diamine,
2,4-naphthoyl-N,N'-diacetyl diamine,
2,5-naphthoyl-N,N'-diacetyl diamine,
2,6-naphthoyl-N,N'-diacetyl diamine,
2,8-naphthoyl-N,N'-diacetyl diamine,
3,5-naphthoyl-N,N'-diacetyl diamine,
3,6-naphthoyl-N,N'-diacetyl diamine,
3,7-naphthoyl-N,N'-diacetyl diamine,
3,8-naphthoyl-N,N'-diacetyl diamine,
4,5-naphthoyl-N,N'-diacetyl diamine,
4,6-naphthoyl-N,N'-diacetyl diamine,
4,7-naphthoyl-N,N'-diacetyl diamine,
4,8-naphthoyl-N,N'-diacetyl diamine,
5,6-naphthoyl-N,N'-diacetyl diamine,
5,7-naphthoyl-N,N'-diacetyl diamine,
5,8-naphthoyl-N,N'-diacetyl diamine,
6,7-naphthoyl-N,N'-diacetyl diamine,
6,8-naphthoyl-N,N'-diacetyl diamine,
7,8-naphthoyl-N,N'-diacetyl diamine, and their various substituted or unsubstituted unsaturated or saturated derivatives. Examples of heterocyclic diacetyl diamines are N,N'-diacetyl piperazine, its substituted derivatives or position isomers, and the like Polyarylene amides composed strictly of para- components, as was stated previously, are insoluble in N,N-dimethyl acetamide-lithium chloride. However, if one of the components, either the aromatic-alkanoic dianhydride or the aromatic diacyl diamine is meta-, then the polymer is soluble in N,N-dimethyl acetamide-lithium chloride as 20% solids at room temperature. In case that either of the components is in admixture with the other and consists of 80% para- molecules, then a polymer still soluble in N,N-dimethyl acetamide-lithium chloride is obtained, but the maximum solids content in the solvent system does not exceed 17 percent solids at room temperature. Unless otherwise indicated, all parts, proportions, percentages, and ratios herein are by weight.

In general, it is preferred to carry out the alkanoyl derivative-forming reaction at temperatures from below the freezing point of water to substantially above the boiling point of water. Thus, the reaction can be desirably carried out at temperatures in the range of 0° C. to 200° C. It will be appreciated that the temperature at the beginning of the alkanoylation step will in many instances be maintained at the lower end of the range to control what could be an overly vigorous initial reaction, and then the temperature will be permitted to rise so as to achieve completeness of reaction and strip off the alkanoic acid or hydrogen chloride produced during the derivative formation.

The polymer formation can be carried out at temperatures of from about 140° C. to about 400° C. Generally, higher temperatures result in greater chain lengths in the finished polymers, and as previously noted, this is readily monitored by the quantity of alkanoyl derivative-forming material which is stripped from the reaction mixture. The maximum temperature which is required to achieve a given completeness of reaction or a given molecular weight of polymer will vary according to the pressure under which the polymerization is conducted. As noted above, the use of subatmospheric pressure requires lower temperatures for a given completeness.

An advantage obtained according to some preferred embodiments of the present invention is that the acylating agent can be recovered from the reaction which produces the polyarylene material. This affords a means of carrying out a continuous process in which the acylating agent utilized to prepare the alkanoyl derivative is recovered after the polymerization in substantially the same amount as is used to form the alkanoyl derivative, so there is no net use of the anhydride, acyl chloride, or ketene. The overall reaction merely involves the consumption of the arylene material or materials which are originally acylated, and these arylene materials provide the desired polymer.

Regardless of the particular type of polymer being prepared, an acyl material is optional during polymer formation, and acyl material will be taken to include any such substances formed during the polymerization, for instance, alkanoic anhydride or alkanoyl chloride. More specifically, reaction of the alkanoyl derivative of arylene carboxylic acid or arylene hydroxyl with the alkanoyl derivative of arylene amino, arylene hydroxyl, or arylene thiol will eliminate an alkanoic anhdride, and the reaction of a chloroarylene with an alkanoyl derivative of arylene amine, arylene hydroxyl, arylene thiol, or arylene carboxylic acid will eliminate the alkanoyl chloride. In the case of anhydride elimination, the two alkanoyl moieties comprising the anhydride can be the same or different. As taught above, it is generally preferred that they be the same, especially in a continuous reaction system.

When alkanoic anhydride is the acyl material eliminated during polymer formation, it can be used to form the alkanoyl derivative directly with a further amount of arylene material or, alternatively, it can be converted to the ketene by heating at 450° C. to 600° C. Thus, with a ketene acylating material a continuous process can also be executed. When alkanoyl chloride is eliminated during the polymerization, it can be used directly to form further alkanoyl derivatives of arylene materials.

It should be noted that, when a haloarylene is utilized, it can be either bromoarylene or chloroarylene, with the former providing a higher reaction rate in many instances than the latter. However, considerations of availability, cost, and compatibility with other reactants make the chloroarylene preferred. It will be appreciated by those slkiled in the art that equivalent haloarylenes can be substituted for the chloroarylene, in terms of which the invention will be hereinafter described.

The reaction to provide polymers according to the process of this invention can be carried out to provide random, block or ordered copolymers from various combinations of substituted arylenes. Thus, the dialkanoyl derivative of p-aminophenol can be reacted with the dialkanoyl derivative of m-thiobenzoic acid to provide a polymer containing amide, carbonate, and secondary amine linkages. Alternatively, the dialkanoyl derivatives of aminoaniline, benzene dioic acid, dihydroxy benzene and dithiobenzene can be used to provide the desired polymeric reaction product. Similarly, fused polynuclear hydrocarbon and ring assemblies can be used to provide the arylene, as described herein.

The wholly aromatic polyamides obtained according to the novel process are useful as high temperature insulators, protective curtains, drapes, for filtering fabrics, packing and sealing materials, brake linings and gear discs. In the aeronautical industry these materials can be used in parachutes, carburetor reservoirs, tires, piping systems, tubes and insulators. Another application is that of tire cords and transmission belts, especially those subjected to high temperatures for long periods. In the dry cleaning industry the pressing cloths manufactured from such fibers have a high stability to hydrolysis.

In the form of film the aromatic nylon polymers of the invention can be used in upholstery material for the interior of airplanes, aircraft and automobiles, decorative furnishigs, as temperature resistant electrical insulators for the insulation in dry transformers, condensers, cable winding, etc. Such polymers are also useful as temperature resistant coatings covering elements subjected to high temperatures or high energy radiation, such as corrosion resistant tubes, conduits for hot water, tube systems for hot air ventilation, fuselage coverings and covers for other parts of aircraft, furnishings for stamping rollers, printing elements, ribbons for covering hot tubes in layers where the films are connected with metallic sheets, and the like. Paints, films, coatings, fibers, fibrils, fibrids and nonburning paper prepared from the wholly aromatic polyamides according to this invention are resistant toward high temperature, radiation, and chemical attack and their exceptional properties make them useful as protective means in satellite systems exposed to severe conditions.

The elimination of acetic anhydride from mixed meta-amino-N-acetyl benzoic-acetic anhydride and from other similar compounds is generally carried out in a vessel provided with a condensing system to permit trapping out of the acetic anhydride formed during the polymerization reaction.

The following examples are given to illustrate embodiments of the invention as it is now preferred to practice it. It will be understood that these examples are illustrative only and the invention is not to be considered as restricted thereto except as indicated in the appended claims.

Example I

Three moles (663 grs.) of mixed meta-amino-N-acetyl benzoic-acetic anhydride is placed in a glass two-liter resin kettle equipped with a thermometer, stirrer, nitrogen bubbler, and Dean-Stark water trap and heated to a temperature of about 150° C. The temperature is maintained at 150° C. for 10 minutes and then slowly raised to 190° C., whereupon the first drops of acetic anhydride start to distill off. The distilled acetic anhydride is collected, the amount of anhydride indicating the degree of polymerization. Then the temperature is gradually raised at the rate of 10° C. every 15 minutes to 350° C. where it is held for one hour to complete polymer formation. Then a vacuum of 10 mm. Hg is applied for 30 minutes. The amount of distilled acetic anhydride is found to be 304 grs. which is a 99.6% recovery.

The mixed meta-amino-N-acetyl benzoic-acetic anhydride is prepared according to the following three alternative methods:

(1) Meta-amino benzoic acid is reacted with acetic anhydride at room temperature by cooling with wet ice. The reaction of the amino group with the acetic anhydride is exothermic. After the reaction has ceased, the mixture is heated up to 130° C. for 15 minutes until the by-product acetic acid comes off. Then an excess of acetic anhydride is added and the mixture is refluxed at 145° C. for 3 hours. Upon cooling the mixed meta-amino-N-acetyl benzoic-acetic anhydride is settled out, filtered, and dried in a vacuum oven for 3 hours.

It is possible that some meta-N,N-diacetyl aminobenzoic acid can be formed with the previous conditions. However, this is immaterial, because an exchange reaction takes place and the mixed meta-amino-N-acetyl benzoic-acetic anhydride is formed upon further heating.

(2) The meta-amino-N-acetyl benzoic acid is formed, as previously stated, below room temperature by using equivalent quantities of meta-amino benzoic acid and acetic anhydride. Upon cooling at −10° C. the meta-amino-N-acetyl benzoic acid is crystallized out, and separated from acetic acid by washing it with toluene and with water and drying in a vacuum oven. This meta-amino-N-acetyl benzoic acid is reacted with an equivalent quantity of acetyl chloride to yield the mixed meta-amino-N-acetyl benzoic-acetic anhydride by elimination of gaseous hydrochloric acid.

(3) Using an excess of acetic anhydride and meta-amino benzoic acid, the meta-amino benzoic acid is charged to the reaction vessel first and then the acetic anhydride is poured dropwise until the exothermic reaction ceases. Then the excess of acetic anhydride is added and the reaction continues as set forth above.

Example II

Into a two-liter glass kettle equipped with thermometer, mechanical stirrer, nitrogen bubbler, and Dean-Stark trap are charged 334 grs. (1.5 moles) of mixed isophthalic-acetic dianhydride and 288 grs. (1.5 moles) of meta-phenylene-N,N'-diacetyl diamine and the mixture is heated to 185° C. for 15 minutes. whereupon the first drops of acetic anhydride start to distill off. The temperature is then raised 20° C. every 15 minutes up to 350° C. where it is maintained for 30 minutes to form nylon polymer and the collected amount of acetic anhydride is 152.5 grs., almost 99% recovery.

The recovered acetic anhydride is reused again for preparing either the isophthalic-acetic dianhydride or the meta-phenylene diacetyl diamine. This demonstrates that acetic anhydride can be continuously recycled.

The preparation of mixed isophthalic-acetic dianhydrides is carried out according to the following three alternative methods:

(1) One mole isophthalic acid is refluxed with a fivefold equivalent of acetic anhydride at 150° C. for 2 hours. After cooling, the isophthalic-acetic dianhydride is settled out, filtered, washed with toluene, and vacuum-dried in an oven.

(2) Isophthalic acid is reacted with 2 equivalents of acetyl chloride at a temperature of from 60°–80° C. until 2 equivalents of gaseous hydrochloric acid are removed. The product is vacuum oven-dried.

(3) By using a tenfold equivalent of acetic anhydride, the mixed anhydride can be prepared from isophthalic acid in the presence of meta-phenylene diamine.

Aromatic polycarbonates have been prepared in the past from the reaction of aromatic dihydroxybenzenes like resorcinol, bis-phenol A and phosgene by elimination of gaseous hydrochloric acid. Another alternative route to polycarbonates is from dihydroxy benzene and ethylene carbonate by an exchange reaction.

In the present method the polycarbonates are prepared from, for example, chlorobenzoic or hydroxybenzoic acid and acetic anhydride through the formation of chlorobenzoic acid-acetic anhydride or acetates of mixed hydroxy benzoic-acetic anhydride. In the case of polycarbonates the benzoic acid is reacted with an excess of acetic anhydride regardless of the relative group position in the benzene ring. At around 50° C., preferably in the presence of traces of an acid catalyst such as sulfuric acid, the acetate ester of benzoic acid is formed. Around 150° C. and under reflux conditions for 1 hour, the acetate ester of mixed benzoic-acetic anhydride is formed. From 180° C.–280° C. acetic anhydride is split off and the polycarbonate is formed. By raising the temperature up from 180° C. to 280° C. at a rate of 10° C. per 10 minutes, a proportional increase in the molecular weight of the aromatic polycarbonate is obtained.

Another alternative route to polycarbonates based on the present invention is from a dihydroxy aromatic, an aromatic dibasic acid, and an excess of acetic anhydride. This method involves the in situ formation of diesters of the dihydroxy benzenes, the formation of mixed acetic dianhydrides of aromatic dibasic acids at 150° C. under five hours refluxing conditions, and then the splitting off of acetic anhydride at 180° C. to 330° C. The same results are also obtained by using directly the diesters of the dihydroxy benzenes and the mixed acetic dianhydrides of aromatic dibasic acids, or dichlorobenzene and benzene dioicacetic dianhydride.

Thus, the polycarbonates are formed according to the present invention by reacting an arylene alkanoate with a mixed arylene carboxylic acid-alkanoic acid anhydride and eliminating the alkanoic acid anhydride so formed. They can also be formed by reacting dichloroarylene with mixed arylene dioic-alkanoic dianhydride and eliminating the alkanoyl chloride so formed. The arylene alkanoate is an alkanoic acid anhydride derivative prepared by reacting an arylene hydroxyl with the anhydride, and the mixed anhydride is an alkanoic anhydride prepared by reacting the arylene carboxylic acid with alkanoic acid anhydride. The aromatic polycarbonates so formed have been found useful as molding plastics resistant up to 360°

C. and are unaffected by strong inorganic acids and therefore they are distinguished for their anticorrosiveness.

Polyarylene thiocarbonates have not been available in the past, and the present invention accordingly affords novel aromatic polythiocarbonates. Such thiocarbonates are formed by the reaction of an alkanoyl derivative of an arylene carboxylic group with an alkanoyl derivative of an arylene thiol. The alkanoyl derivatives are readily formed as described above by reacting the desired acylating agent with the arylene carboxylic group and the arylene thiol group at temperatures ranging from 0° C. to about 200° C. The initial stages of the alkanoylation are desirably carried out at the lower temperatures to provide good control of the reaction, and then the reaction-mixture can be gradually increased in temperature to obtain higher completeness of reaction. Here again, the reaction can be carried out with an equimolar or larger quantity of acylating agent.

The polymerization is carried out by heating the arylene alkanoyl derivatives to a temperature sufficient to drive off or eliminate the acyl material. Accordingly, the reaction can be carried out with S-alkanoyl thiobenzoic-alkanoic anhydride or with S,S'-dialkanoyl dithioarylene and phenylene dioic-alkanoic dianhydride. The aromatic polythiocarbonates so formed yield more flexible and tougher engineering plastics for many uses than the aromatic polycarbonates. These polythiocarbonates are well suited for high temperature applications in aircraft, missiles, electrical insulators, and mechanical parts where toughness and flexibility are required. It will be understood that the polythiocarbonates can have a wide range of molecular weights, depending upon the uses to which the thiocarbonates are to be put. Such polyarylene thiocarbonates preferably have molecular weights in the range of from 5,000 to about 100,000.

The polyarylene sulfides which can be obtained according to the present process have not heretofore been available, so that the process provides novel aromatic polysulfides. The aromatic polysulfides can be prepared by reacting the alkanoyl derivatives of an arylene thiol with either a chloroarylene or an alkanoyl derivative of an arylene hydroxyl group. The alkanoyl derivatives are formed as taught hereinabove by reacting an alkanoylating agent with the thiol or hydroxyl group to provide, respectively, an arylene S-alkanoyl or an arylene acetate. When the chloroarylene is utilized in the reaction with the thiol derivative, the acyl material eliminated is alkanoyl chloride and when the hydroxyl derivative is used in conjunction with the thiol derivative, the acyl material eliminated is alkanoic anhydride. The elimination is carred out by gradually raising the reaction temperature to drive off the acyl material and form the polysulfide having the desired molecular weight. Temperatures of about 180° C. to about 400° C. are useful for the reaction to provide polysulfide. Thus, for example, phenylene polysulfides are formed by reacting S-alkanoyl chlorothiobenzene or S,S'-dialkanoyl dithiobenzene with dichlorobenzene to eliminate alkanoyl chloride, or by reacting S-alkanoyl thiophenylacetate or S,S'-dialkanoyl dithiobenzene with O,O'-dialkanoyl dihydroxybenzene to eliminate alkanoic anhydride.

The polyarylene sulfides so formed provide flexible temperature-resistant paints, films and coatings. They can also serve as cross-linking agents for epoxy resins and as accelerators in the production of finished rubber goods. The novel polyarylene sulfides provided by this invention can have a wide range of molecular weights, depending upon their end uses. Thus, such aromatic polysulfides preferably have molecular weights in the range of from 5,000 to about 100,000.

Secondary aromatic polyamines had not been prepared in the past as polymeric compounds, and the present invention accordingly provides novel aromatic polyamines. As an example of the present method, aromatic aminophenols are reacted at first below room temperature with an excess of acetic anhydride. The resulting anhydride derivative is a phenol acetamide. Around 50° C. and in the presence of traces of sulfuric acid the acetate ester of phenol acetamide is formed. At 150° C. the excess of acetic anhydride is driven off, and then the temperature is raised up to 180° C. At that temperature the acetate ester of phenol acetamide splits off acetic anhydride and a polyamine is formed. By raising the temperature up from 180° C. to 300° C. at a rate of 10° C. per 2 minutes, a proportional increase in the molecular weight of the aromatic polyamines is obtained.

Another alternative route to the polyamines based on the present invention is from dihydroxy benzene, aromatic diamine, and an excess of acetic anhydride. This method involves the in situ formation of acetic diesters of the dihydroxy benzenes, the formation of diacetyl aromatic diamines, and the splitting off of acetic anhydride at 180° C. to 325° C. The direct heating of acetic diesters of the dihydroxy benzenes and diacetyl aromatic diamines at 180°–325° C. in the presence or absence of solvents, diluents and/or vacuum produces secondary polyamines.

It will be appreciated from the present description that such polyamines can be prepared by similarly reacting N-alkanoyl aminochloroarylene or N,N'-dialkanoyl diaminoarylene with dichloroarylene to eliminate alkanoyl chloride, as well as by reacting an arylene alkanoate with an arylene alkanoylamine and eliminating the alkanoic acid anhydride so formed. The arylene alkanoate is an alkanoic acid anhydride derivative prepared by reacting an arylene hydroxyl with the anhydride, and the arylene alkanoylamine is an alkanoic acid anhydride derivative prepared by reacting an arylene amine with the anhydride. The secondary aromatic polyamides are useful as cross-linking agents for epoxy resins and also as special hydraulic fluids.

The novel polyarylene amines produced according to the present invention can have a wide range of molecular weights, depending upon the end use to which the material is to be put. Such aromatic polyamines preferably have molecular weights in the range of from about 5,000 to about 50,000.

The preparation of high molecular weight polyarylene ethers has not been reported. In the present method the preparation of such wholly aromatic polyethers is performed, for example, as follows: Di-phenols or bis-phenol A are reacted with an excess of acetic anhydride in the presence of traces of sulfuric acid as a catalyst at around 50° C. for 15 minutes. At 145° C. the excess of the acetic anhydride is driven off and then the temperature is raised to 175° C. where formation of the aromatic polyether takes place. By raising the temperature from 175° C. to 310° C. at a rate of 10° C. per 20 minutes, a proportional increase in the molecular weight of aromatic polyethers is obtained.

It will be appreciated from the present description that such aromatic polyethers can be prepared by similarly reacting chloroarylene alkanoate or dichloroarylene with arylene dialkanoate to eliminate alkanoyl chloride, as well as by reacting an arylene alkanoate with another arylene alkanoate and eliminating the alkanoic acid anhydride so formed. The arylene alkanoates are alkanoic acid anhydride derivatives prepared by reacting an arylene hydroxyl with the anhydride. The aromatic polyethers are useful as brake depression fluids for automobiles and aircraft. Also they are useful as high boiling solvents.

The novel polyarylene ethers provided by this invention can have a wide range of molecular weights depending upon their end use. Thus, such aromatic polyethers preferably have molecular weights in the range of from about 5,000 to about 100,000.

EXAMPLE III.—Preparation of meta-N-acetyl amino benzoic-acetic anhydride in situ, from m-amino benzoic acid and acetic anhydride One mole (137 grs.) of purified meta-amino benzoic acid is placed in a two-liter glass round flask equipped with a stirrer, thermometer, nitrogen bubbler, and Dean-Stark trap, and one mole (102 grs.) of acetic anhydride is added dropwise under continuous stirring. This reaction is slightly exothermic and a cooling bath of wet ice is used to remove the heat developed.

The addition of acetic anhydride takes place in a matter of 30 minutes. Upon cessation of the exothermic reaction the cooling bath is removed and the contents heated to 120° C. slowly in order to complete the reaction and remove the acetic acid formed as a by-product. At that stage the product of reaction is an m-N-acetyl amino benzoic acid (100% yield).

Five additional moles (510 grs.) of acetic anhydride are added and the whole mixture is refluxed at 150° C. for 3 hours. Then, most of the acetic anhydride excess is removed and the contents cooled to room temperature, filtered, and dried in a vacuum oven at 60° C. overnight. Mixed meta-N-acetyl amino benzoic-acetic anhydride is obtained.

Mixed ortho-N-acetylamine benzoic-acetic anhydride is prepared in the same manner as Example III. Mixed para-N-acetylamino benzoic-acetic anhydride, N-acetyl amino naphthoic-acetic anhydride and their various substituted and unsubstituted derivatives are prepared in accordance with the method of Example III with the second acetylation stage being carried out at 160° C. for 4 hours.

Example IV.—Preparation of the mixed acetic dianhydrides of isophthalic acid from isophthalic acid and acetic anhydride One mole (166 grs.) of purified isophthalic acid (obtained from Oronite Chemical Co.) is placed in the apparatus of Example III together with ten moles (1020 grs.) of acetic anhydride. The mixture is refluxed for 3 hours at 160° C. then cooled to room temperature. The formed mixed acetic acid dianhydride of isophthalic acid is settled out after cooling and dried in a vacuum oven overnight.

Example V.—Preparation of mixed acetic dianhydrides of isophthalic acid from isophthalic acid and acetyl chloride One mole (166 grs.) of purified isophthalic acid and 2 moles (157 grs.) of acetyl chloride are placed in apparatus similar to that of Example III and refluxed at 70° C. for 1½ hours. The end of reaction is determined from the collected gaseous hydrochloric acid. The mixed acetic dianhydride of isophthalic acid so obtained is dried in a vacuum oven for 2 hours at 60° C.

Example VI.—Preparation of the meta-N,N'-diacetyl phenylene diamine

One mole (108 grs.) of purified meta-phenylene diamine obtained from E. I. du Pont de Nemours & Co. is placed in a two liter glass kettle equipped with a stirrer and thermometer. The glass kettle is placed in an isopropanol-Dry Ice cooling bath. Two moles (204 grs.) of acetic anhydride are poured in dropwise with vigorous stirring. Upon addition of the acetic anhydride and cessation of the exothermic reaction, the cooling bath is removed. In order to complete the reaction and to remove the acetic acid formed, the mixture is heated to 130° for 45 minutes, cooled to room temperature, washed with water and dried in an oven at 110° C. for one hour to obtain the mixed anhydride. Instead of acetic anhydride, acetyl chloride or acetic acid can be used.

Preparation of the ortho-N,N'-diacetyl phenylene diamine, para-N,N'-diacetyl phenylene diamine, bis (p-N-acetyl phenylamine), 1,6-N,N'-diacetyl naphthalene diamine and their various position isomers and substituted or unsubstituted derivatives can be carried out with 2 or more moles acetic anhydride, acetic, acid, or acetyl chloride per mole of aromatic diamine, as set forth above. Similarly, preparation of the 1,6-mixed acetic dianhydride of ortho-phthalic acid, of terephthalic acid, of bis(phenyl carboxylic acid), of naphthalene dicarboxylic acid, their various position isomers and substituted or unsubstituted derivatives is carried out with the dibasic acid and an excess of acetic anhydride by refluxing at 160° C. for 4 hours according to Example IV, and preparation of N,N'-diacetyl-o-phenylene diamine is similarly carried out.

Example VII.—Preparation of meta-acetate ester of mixed benzoic-acetic anhydride One mole (138 grs.) of purified meta-hydroxy benzoic acid (obtained from Eastman Kodak Co.) is placed in a two liter glass kettle together with 6 moles (612 grs.) of acetic anhydride and 4 drops of sulfuric acid. The whole mixture is carefully heated to 40° C. under vigorous stirring for 25 minutes and then heated to 150° C. for seventy minutes under reflux. Most of the excess of acetic anhydride is removed and the product obtained is filtered, washed with cool toluene and dried in a vacuum oven at 60° C. overnight.

Preparation of the ortho-acetate ester of benzoic-acetic anhydride, of the para-acetate ester of benzoic-acetic anhydride, and the acetate ester of naphthoic-acetic anhydride, as well as their various isomers and substituted or unsubstituted derivatives, is carried out according to the process of Example VII. The only difference is the acetylation of the carboxylic group takes place at 160° C. over 1½ to 3 hours.

Example VIII.—Preparation of meta-acetate ester of N-acetyl aminophenol

One mole (109 grs.) of purified meta-amino phenol (obtained from Eastman Kodak Co.) is placed in a two liter glass kettle provided with cooling facilities. Two moles (204 grs.) of acetic anhydride is added dropwise under continuous stirring and cooling in a matter of 25 minutes. Upon cessation of the exothermic reaction the admixture is brought to 50° C. and 4 drops of sulfuric acid are added to catalyze the acetylation of the phenolic group. This temperature is maintained for 25 minutes and then raised to 130° C. The formed acetic acid is driven off within 30 minutes to obtain the acetate ester of m-N-acetyl amino phenol.

Preparation of the acetate ester of o-N-acetyl amino phenol, p-N acetyl amino phenol, bis(N-acetylamine phenols), and N-acetyl amino naphthols and their various isomers and substituted or unsubstituted derivatives, is carried out according to Example VIII.

Example IX.—Preparation of the diacetate of dihydroxybenzene

One mole (110 grs.) of resorcinol is placed in a two liter glass kettle, and two moles (204 grs.) of acetic anhydride plus 4 drops of sulfuric acid are added. The mixture is heated to 50° C. with good stirring for 15 minutes and then heated slowly to 120° C. to remove the formed acetic acid.

Preparation of the diacetates of 1,2-dihydroxybenzene, 1,4-dihydroxybenzene, 4,4'-dihydroxy diphenyl, and 1,6-dihydroxy naphthalene, and of their position isomers and their various substituted or unsubstituted derivatives is carried out in accordance with the procedure of Example IX.

Example X.—Preparation of poly meta-benzamide

One mole (221 grs.) of meta-N-acetyl aminobenzoic-acetic anhydride prepared in Example III is placed in a two liter glass flask equipped with stirrer, thermometer, nitrogen bubbler and Dean-Stark trap. The temperature is raised to 180° C., and the first drops of acetic anhydride are formed. After that the temperature is raised 10° C. every 15 minutes up to 360° C., where it is held for two additional hours. At that point the collected amount of acetic acid is 101 grs., demonstrating a 99.3% recovery.

The observed phenomena are, firstly, melting of the mixed anhydride, secondly, an increase in the viscosity of the melted product as a function of the acetic anhydride removal, and finally, solidification of the formed polyamide near the end of this reaction.

The produced polybenzamide (nylon) is almost identical with nylons produced by the known techniques. It is brought into solution by heating together 80 parts of N,N-dimethyl acetamide containing 5% lithium chloride and 20 parts of polybenzamide. The inherent viscosity of this polymer is 2.4.

In the present description the "inherent viscosity" ($\eta_{inh.}$) is defined by the following formula:

$$\eta_{inh.} = \frac{\ln \eta^*_r}{C}$$

in which $\ln \eta^*_r$ represents the natural logarithm of the relative viscosity and C the concentration of 0.5 gr. of the polymer in 100 mls. of solution. The relative viscosity $\eta^*_r$ is obtained by dividing the flow time of a dilute solution of the polymer by the flow time of the pure solvent. Both measurements are carried out at 30° C. In aromatic polyamides the preferred compositions having an inherent viscosity of at least 0.7 and preferably higher than 1.5 can be wet- or dry-spun into fibers having exceptional heat stability.

These fibers keep their physical properties to an excellent degree, after being exposed to high temperature. For example, fibers obtained from the meta-polybenzamide of Example X are stable after being subjected to a temperature of 340° C. for several weeks or of 440° C. for 2 hours. Furthermore, aromatic polyamides having monomer units of p,p'-bibenzoyl benzamide are stable at temperatures above 550° C. The "zero resistance temperature" (the temperature at which fibers are unable to support a load of 0.1 gr. per denier) of fibers of polybenzamides is between 480° and 600° C.

Example XI.—Preparation of polybenzamide from meta-N-acetyl amino benzoic-acetic anhydride The experiment of Example X is repeated as above with the exception that the dichloro bis-phenyl is used as a diluent. In this case the acetic anhydride is removed at 300° C. in a matter of 2 hours. The polymer solution indicates an inherent viscosity of 3.4.

Example XII.—Polymerization in situ of meta-N-acetyl benzoic-acetic anhydride from meta-amino benzoic acid and acetic anhydride in excess One mole (137 grs.) of purified meta-amino benzoic acid is charged into a two liter glass kettle equipped as in Example X. Five moles (510 grs.) of acetic anhydride are carefully added under continuous stirring. The temperature is slowly raised to 150° C. and the mixture is refluxed for 2 hours. Then the excess acetic anhydride is removed and collected for reuse.

The temperature is raised to 180° C. and the procedure continued according to Example X. When the polymer so produced is brought into solution, it has an inherent viscosity of 2.9.

Example XIII.—Polymerization of para-N-acetyl aminobenzoic-acetic anhydride

One mole (221 grs.) of para-N-acetyl aminobenzoic-acetic anhydride is placed in a two liter glass flask fully equipped and heated to 200° C. until the first drops of acetic anhydride are formed. Then 50 grs. of decahydronaphthalene is added as a diluent, and the temperature is raised to 340° C. where it is held for 2 hours.

The para-polybenzamide so formed passes through the following steps: molten fluid, slightly viscous, very viscous, and finally, solidified. This polymer does not dissolve in a warm solution of N,N-dimethyl acetamide-lithium chloride.

Example XIV.—Preparation of poly-meta-bis-phenylene diamine-isophthalamide from the mixed isophthalic-acetic dianhydride and meta-phenylene N-N'-diacetyl-diamine One mole (250 grs.) of mixed isophthalic-acetic dianhydride and one mole (192 grs.) of meta-phenylene N,N'-diacetyl diamine are placed in a two liter glass flask fully equipped and heated to 180° C. until the first drops of acetic anhydride appear. Then the temperature is taken up 10° C. every 15 minutes to 340° C., where it is held for 50 additional minutes. The collected acetic anhydride is 101 grs. which is a 99.3% recovery.

When the polymer is brought into solution it has an inherent viscosity of 3.2. The physical and chemical properties of this polymer are identical with those prepared from isophthaloyl chloride and meta-phenylene diamine in a solvent system.

Example XV.—Preparation in situ of poly-meta phenylene diamine-isophthalamide from isophthalic acid and meta-phenylene diamine One mole (108 grs.) of distilled meta-phenylene diamine (obtained from E. I. du Pont de Nemours & Co.) and 1 mole (166 grs.) of purified isophthalic acid (obtained from Amoco Chemical Corp.) are placed in a two liter glass kettle fully equipped. Five moles (510 grs.) of acetic anhydride are poured in dropwise, under continuous stirring and cooling until the exothermic reaction ceases. At that point the remaining excess of acetic anhydride is added and a slow heating under continuous stirring is applied. It takes about 1 hour to reach 140° C., at which the mixture is refluxed for 3 additional hours. Then the excess acetic anhydride is removed and the temperature increased 20° C. every 10 minutes. The first drops of acetic anhydride are formed at 180° C. The formed polymer has an inherent viscosity of 2.9.

Example XVI.—Preparation of poly-para phenylene diamine-terephthalamide from mixed terephthalic-acetic dianhydride and meta-phenylene N,N'-diacetyl diamine One mole (221 grs.) of mixed terephthalic-acetic dianhydride and one mole (192 grs.) of meta-phenylene N,N'-dimethyl diamine are placed in a two liter glass kettle fully equipped. This experiment proceeds according to Example XIII to produce the polyamide.

Example XVII.—Preparation in situ of poly-para phenylene diamine-terephthalamide from terephthalic acid and meta-phenylene diamine and acetic anhydride Into a two liter glass kettle fully equipped as in Example XIII are charged 1 mole (166 grs.) terephthalic acid and 1 mole (108 grs.) meta-phenylene diamine. Ten moles (1020 grs.) of acetic anhydride are placed in a dry funnel. The experiment proceeds according to Example XIII to obtain the polyamide.

The same experiment is repeated with diphenyl ether as a diluent.

Other experiments were performed by replacing meta-phenylene diamine with the following:

(a) Para-phenylene diamine
(b) Bis-(p-amino benzene)
(c) 1,6-naphthalene diamine.
(d) m,m'-Phenylene bis-benzamide diamine
(e) Bis-meta-phenylene diamine
(f) Bis-meta-phenylene diamine
(g) Piperazine
(h) 2,7-naphthalene diamine.

The polyamides formed from the foregoing amines with the exceptions of (b), (c), (d) and (e) are soluble in N,N-dimethyl acetamide-lithium chloride.

The invention is further disclosed in the following data on a large number of polyamides prepared according to the process described and exemplified herein. For convenience in presenting the data in the tables which appear hereinbelow, the various polymers are designated according to a code system. In this code system, the letters "HT" and "TR" stand, respectively, for "high temperature" and "temperature resistant" types of polymers. The constituents of the polymers are indicated by numerals according to the system shown, as follows:

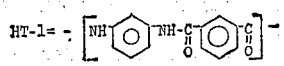

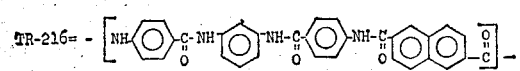

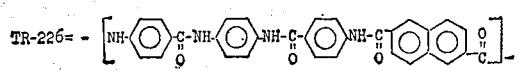

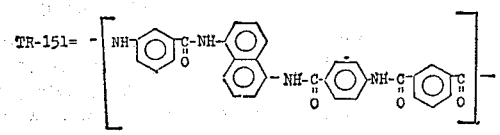

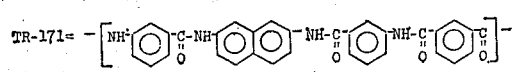

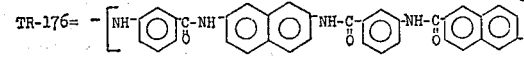

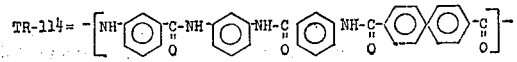

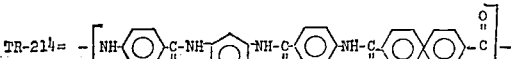

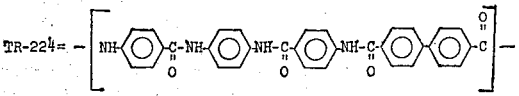

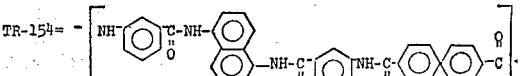

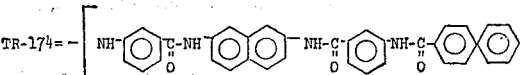

wherein

is taken to indicate the benzene ring and

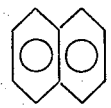

is taken to mean the naphthalene ring.

Table I compares the melting points of polyamides made according to the process of this invention, as follows:

TABLE I.—POLYAMIDE MELTING POINTS

| Polyamide | Calculated $T_m$ (° C.) | Observed $T_m$ (° C.) | Observe $T_d$ (° C.) |
|---|---|---|---|
| HT-1 | 427 | 427 | 435 |
| TR-116 | 438 | >500 | 490 |
| TR-216 | 463 | >500 | 485 |
| TR-226 | 476 | (a) | >500 |
| TR-151 | 432 | >500 | >500 |
| TR-171 | 440 | 410 | 490 |
| TR-176 | 452 | 465 | 465 |
| TR-114 | 458 | 435 | 480 |
| TR-214 | 482 | 490 | 490 |
| TR-224 | 495 | 500 | >500 |
| TR-141 | 458 | 475 | 480 |
| TR-144 | 489 | 485 | >500 |
| TR-146 | 470 | >500 | 470 |
| TR-154 | 464 | 410 | 410 |
| TR-174 | 470 | >500 | 430 | a Insoluble polymer; gives erratic DTA curve.

In Table I, $T_m$ is the melting temperature of the polymer, and $T_d$ is the temperature at which the polymer begins to decompose under the influence of heat. The calculated $T_m$ is based on the assumption that for rigid molecules of two similar compounds A and B $$\frac{T_A}{T_B}=\frac{E_A}{E_B}$$

where T is the melting point (degrees Kelvin) and E is the cohesive energy of the compound. Thus, using a literature value of 427° C. (700° K.) as the melting point of Du Pont's polymer HT-1, the calculated melting point for a similar polyamide A is $$T_A=\frac{700 E_A}{5500}$$

where $E_A$ is the cohesive energy per chain unit, which may be calculated from the data in Table II as follows:

TABLE II.—COHESIVE ENERGY VALUES

| Structure | Cohesive energy (cals./mol.) |
|---|---|
| —C—N—<br>‖ \|<br>O H | 8,500 |
| (benzene ring) | 2,600 |
| (para-phenylene) | 3,900 |
| (naphthalene) | 3,165 |
| (biphenyl) | 3,810 |
| (biphenyl substituted) | 4,030 |
| (terphenyl) | 5,850 |

The cohesive energy of the polymer units is calculated using the procedure exemplified as follows:

TR–111 contains 8 "chain units" in its repeating unit: Four of these are COHN groups (cohesive energy 8500 cal. per unit—see Table II) and four are m-phenylene (cohesive energy 2600 cal. per unit). Thus the repeating unit represents 4×8500+4×2600=44,400 cal./mole. Dividing by 8, the cohesive energy per "chain unit" of TR–111 is 5,550 cal./mole. This is also clearly the figure for HT–1 and for TR–1.

Example XVIII.—Preparation of aromatic polyamides derived from a mixed isophthalic-acetic dianhydride and bis(N-acetyl phenylamine)

One mole (221 grs.) of mixed isophthalic-acetic dianhydride and one mole (268 grs.) of bis(N-acetyl phenylamine) are charged into a two liter glass kettle fully equipped as in Example X and heated at 200° C. until the first drops of acetic anhydride are formed. Then 100 grs. of decahydronaphthalene diluent is added and the temperature is raised up to 360° C. with a rate of increase of 20° C. every 10 minutes. The reaction is completed in a total time of 3.5 hours and the collected quantity of acetic anhydride is 202 grs. which is 99.2% of the theoretical amount.

The formed polymer is brought into solution, and the inherent viscosity is found to be 3.36. The polymer is identical in physical and chemical properties with polyamides prepared by the interfacial or solvent methods. The process can also be carried out with other diluents such as bis(p-chlorobenzene), diphenyl ether, and the like.

It will be understood that aromatic polymers can also be prepared directly from, for instance, isophthalic acid and bis(p-phenylamine), m-phenylene diamine and bis(p-phenol), and the like by utilizing ten molar equivalents of acetic anhydride. The polymers formed from these materials are soluble in N,N-dimethylacetamidelithium chloride.

Example XIX.—Preparation of polyphenyl carbonates from meta-acetate ester of benzoic acid One mole (238 grs.) of meta-acetate ester of benzoic-acetic anhydride prepared in Example VII is placed in a two liter glass flask equipped as in Example X and heated up to 180° C. until the first drops of acetic anhydride are formed. Then the temperature is raised 10° C. every 15 minutes up to 300° C. until the theoretical amount of acetic anhydride is collected.

The formed polyphenyl carbonate is a clear material of unusual hardness.

Example XX

Example XIX is repeated using 5 mm. Hg vacuum and a maximum polymerization temperature of 220° C. A clear, hard polyphenyl carbonate is obtained.

Example XX illustrates an embodiment of the invention in which the polymerization is carried out under vacuum to cause evolution of anhydride from the reaction mixture at lower temperatures. It will be apparent from the present description that the maximum temperature to which the reaction mixture need be subjected to obtain a given degree of polymerization can be reduced by carrying the polymerization out under vacuum. Accordingly, the present invention provides for the production of polymers from materials which are labile at high temperatures. It will further be appreciated that the vacuum process can be utilized not only to produce aromatic polycarbonates as illustrated above, but that the vacuum process is equally applicable to the production of aromatic polyamides, polyamines, and polyethers. In some processes it may also be advantageous to carry out the process under superatmospheric pressures.

Example XXI

Example XX is repeated using tetrahydronaphthalene as a solvent. This reaction is smoother and takes a total of 2 hours at 250° C. to be completed.

The procedure of Example XIX can be repeated using as starting materials the ortho-acetate ester of benzoic-acetic anhydride, the para-acetate ester of benzoic-acetic anhydride, the acetate esters of bis(phenol carboxylic acid)-acetic anhydride, the 1,6 or 2,7 acetate esters of naphthoic-acetic anhydride and their position isomers and their various substituted or unsubstituted derivatives in the presence or absence of solvents or diluents and with or without the application of vacuum to obtain similar polycarbonates.

Example XXII.—Preparation of polyphenyl carbonates from the diacetate ester of 1,3-dihydroxy benzene (resorcinol) and the mixed isophthalic-acetic dianhydride One mole (196 grs.) of resorcinol diacetate prepared according to the procedure of Example IX and one mole (250 grs.) of mixed isophthalic-acetic dianhydride prepared in accordance with Example IV are placed in a two liter glass flask equipped with a thermometer, stirrer, nitrogen bubbler and a Dean-Stark trap and heated to 180° C. until the first drops of acetic anhydride are formed. Then the temperature is taken up 15° C. every 15 minutes to 300° C. where it is held for an additional hour until the theoretical amount of acetic anhydride is collected.

The same experiment is repeated by using dichloro bisphenyl ether as a solvent and the reaction is completed at 230° C. within 2 hours.

In another flask the application of 2 mm. Hg vacuum results in completion of the reaction in 90 minutes at 200° C. The obtained polyphenyl carbonate in each instance is identical with the one obtained in Example XIX.

Example XXIII

One mole (316 grs.) of bisphenol A diacetate prepared from 2 moles acetic anhydride and one mole bis-phenol A according to the procedure of Example IX and one mole (250 grs.) of mixed terephthalic-acetic dianhydride are placed in a two liter glass flask equipped with a thermometer, stirrer, nitrogen bubbler, and Dean-Stark trap and heated up to 180° C. until the first drops of acetic anhydride are formed. Then the temperature is taken up to 300° C. at 15° C. every ten minutes and held for an additional 1½ hours until almost the theoretical amount of acetic anhydride is removed. A polycarbonate is obtained.

The same experiment is repeated in situ by using an exces of acetic anhydride, traces (a few drops) of sulfuric acid, bisphenol A and (1) terephthalic acid, (2) isophthalic acid, (3) 2,7-naphthalene dicarboxylic acid, or (4) bis(4-benzoic acid). The same experiemnt is repeated by using as solvent dichlorobisphenyl ether and the reaction is completed at 240° C. within 2½ hours. Furthermore, the use of 3.5 mm. Hg vacuum without solvent completes the reaction between bisphenol A diacetate and the mixed dianhydride of terephthalic acid in 2 hours at 210° C.

Example XXIV

Half a mole (158 grs.) of bisphenol A diacetate, half a mole 98 grs.) of resorcinol diacetate, half a mole (125 grs.) of mixed diacetate dianhydride of isophthalic acid and half a mole (125 grs.) of mixed terephthalic-acetic dianhydride are placed in a two liter flask equipped and heated as in Example XXIII. The formed polycarbonate is a copolymer containing units of bisphenol A, resorcinol, m-phenyl and p-phenyl.

The same experiment is repeated in situ by using an excess of acetic anhydride, bisphenol A, traces of sulfuric acid, resorcinol, isophthalic and terephthalic acid. Again diluents or solvents are found useful in lowering the polymerization temperature and time. Application of vacuum results in a shortened polymerization time at lower temperatures. Other aromatic dihydroxy compounds and aromatic dibasic acids can also be used in different molar percent quantities.

Example XXV.—Preparation of polybenzamide ethers

One mole (193 grs.) of acetate ester of m-N-acetyl aminophenol and one mole (36 grs.) acetate ester of mixed m-hydroxy benzoic-acetic anhydride are placed in a two liter glass flask equipped as in Example XXIII and heated to 185° C. until the first drops of acetic anhydride are formed. Then the temperature is taken up to 320° C. at the rate of 15° C. every 10 minutes and held there for an additional hour until the theoretical quantity of acetic anhydride is collected. The formed polymer contains m-benzamide and m-biphenyl ether units.

Example XXVI.—Preparation of poly-benzamide ethers in situ

One mole (105 grs.) of m-aminophenol and one mole (138 grs.) of m-hydroxy benzoic acid are placed in a fully equipped two liter glass flask. Ten moles (1020 grs.) of acetic anhydride are added with continuous stirring and cooling until m-N-acetyl aminophenol is formed. Then 15 drops of sulfuric acid are added and the temperature is taken up to 50° C. where the acetate ester is formed.

At 160° C. for 2 hours under reflux condenser temperature, the formed acetic acid is removed and the mixed anhydride of the acetate ester of m-hydroxy-benzoic acid is formed. Then the excess of acetic anhydride is removed and the temperature raised to 185° C. according to Example XXV. The procedure is continued according to Example XXV.

Example XXVII.—Preparation of mixed meta-N-acetyl amino benzoic-acetate anhydride in situ from meta-amino benzoic acid and acetyl chloride One mole (137 grs.) of purified meta-amino benzoic acid is placed in a two liter glass round flask equipped with a stirrer, thermometer, nitrogen bubbler, and Dean-Stark trap. Two moles (157 grs.) of acetyl chloride are added dropwise under continuous stirring and external cooling in a matter of 35 minutes. Upon cessation of the exothermic reaction, the cooling bath is removed. Slowly the temperature is raised to 90° C. and the contents refluxed for 1 hour in order to remove the formed hydrochloric acid.

Thereafter the contents are cooled to room temperature, filtered and dried in a vacuum oven at 60° C. overnight. At room temperature the formed product is m-N-acetyl aminobenzoic-acetic anhydride.

The procedure of Example XXVII can be carried out with acetyl chloride and aminoaryl carboxylic acids such as o-aminobenzoic acid, p-aminobenzoic acid, bis(amino-benzene-carboxylic acid), aminonaphthoic acids, various substituted and unsubstituted derivatives and position isomers thereof, and the like.

Example XXVIII.—Preparation of acetate ester of meta-hydroxy benzoic-acetic anhydride in situ from m-hydroxy benzoic acid and acetyl chloride In a two liter flask equipped with a stirrer, thermometer, nitrogen bubbler, and Dean-Stark trap is placed one mole (138 grs.) of purified meta-hydroxy benzoic acid (obtained from Eastman Kodak Co.), and two moles (157 grs.) acetyl chloride are poured in dropwise under continuous stirring during 20 minutes. Slowly the temperature is taken up to 90° C. and the contents are refluxed for one hour in order to remove the formed gaseous hydrochloric acid. The flask is cooled at room temperature, filtered and dried in a vacuum oven at 60° C. overnight to recover the acetate ester.

The acetate esters of mixed o-hydroxybenzoic-acetic anhydride, p-hydroxybenzoic-acetic anhydride, bis(hydroxybenzoic)-acetic anhydride, hydroxynaphthoic-acetic anhydride and their derivatives and isomers can be similarly prepared.

Example XXIX.—Preparation of meta-acetate ester of N-acetyl amino phenol from meta-aminophenol and acetyl chloride In a two liter glass kettle are placed one mole (109 grs.) m-aminophenol, and two moles (157 grs.) of acetyl chloride are added dropwise under continuous stirring and cooling within 25 minutes. Upon cessation of the exothermic interaction of the amino group with the acetyl group, the temperature is taken up to 80° C. under reflux to remove the formed gaseous hydrochloric acid. The product is filtered and dried overnight in a vacuum oven at 60° C. to obtain the acetate ester.

Example XXX.—Preparation of 1,3-dihydroxybenzene diacetate

In a two liter glass kettle fully equipped are placed 1 mole (110 grs.) of resorcinol (1,3-dihydroxy benzene) and two moles (157 grs.) of acetyl chloride. The mixture is heated to 30° C. for 40 minutes under continuous stirring and removal of the formed gaseous hydrochloric acid. The formed diacetate ester of 1,3-dihydroxybenzene is dried in a vacuum oven for 2 hours at 60° C.

1,2-dihydroxybenzene, 1,4-dihydroxybenzene, bis-phenol, dihydroxynaphthalene, and derivatives thereof can be similarly treated according to the procedure of Example XXX to obtain the corresponding diacetates.

Example XXXI.—Preparation of copolymeric aromatic polyamides

Fourth-tenths mole (88.4 grs.) of mixed para-N-acetyl-amino benzoic-acetic anhydride, 0.30 mole (66.3 grs.) of meta-N-acetylamino benzoic-acetic anhydride, and 0.30 mole (84 grs.) of mixed bis(N-acetylamino benzoic)-acetic acid dianhydride are placed in a one liter glass flask and heated from 180° C. to 360° C. according to Example X. The aromatic polyamide so formed is a copolymer containing units of meta- and para-benzamide and p,p-bisphenyl amide.

Example XXXII.—Preparation of copolymeric aromatic polyamides in situ

One mole (137 grs.) of meta-amino benzoic acid, half a mole (68.5 grs.) of para-amino benzoic acid, and half a mole (93.5 grs.) of 2,6-amino naphthoic acid are placed in a 2 liter flask and 12 moles (1224 grs.) acetic anhydride are added dropwise. At room temperature the N-acetyl aromatic acids are formed. After refluxing at 160° C. for 5 hours the acetyl aromatic acid-acetic anhydrides are formed and further condense to copolymeric aromatic polyamides according to Example XXX.

Acetyl chloride can be substituted for acetic anhydride in the foregoing example to provide the same copolymer.

Example XXXIII.—Preparation of polyarylene ether

Into a 3-necked spherical flask equipped with stirrer, thermometer, nitrogen bubbler and a drain trap joined to a vertically mounted condenser are placed 0.1 mole (12.85 grs.) of para-chlorophenol and 0.1 mole (10.2 grs.) of acetic anhydride. The exothermic reaction is cooled with ice for 15 minutes after the reactants are placed into the flask. The temperature is then raised to 140° C. for 30 minutes, and 0.1 mole (6 grs.) of acetic acid is collected.

The chlorophenyl acetate so formed is then heated under a reduced pressure of 20 mm. Hg for two hours at 270° C. During this heating under reduced pressure 7.8 grs. of acetyl chloride is collected. The reaction vessel is found to contain an arylene polyether having a softening point in excess of 390° C.

Example XXXIV.—Preparation of polyphenylene secondary amine

Into a 3-necked spherical flask equipped with a stirrer, thermometer, nitrogen bubbler and a trap joined to a vertically-mounted condenser are placed 0.1 mole (12.75 grs.) of para-chloroaniline and 0.1 mole (10.8 grs.) of acetic anhydride. The reaction flask is cooled with ice until the exothermic reaction ceases. The mixture is then heated to 140° C. to collect the 6 grs. of acetic acid formed.

The N-acetyl chloroaniline so produced is then heated under a vacuum at 270° C. for 2½ hours. A total of 7.7 grs. of acetyl chloride is collected to form the polyphenylene amine.

Example XXXV.—Preparation of polyphenylene carbonate

The procedure of Example XXXIII is repeated utilizing 0.1 mole (15.65 grs.) of para-chlorobenzoic acid and 0.1 mole (10.8 grs.) of acetic anhydride. The mixture is refluxed to produce the chlorobenzoic-acetic anhydride and 6.0 grs. of acetic acid is collected. The temperature of the anhydride is then raised to 270° C. under a vacuum of 20 mm. Hg for 2½ hours to drive off 7.7 grs. of acetyl chloride and produce polyphenylene carbonate.

Example XXXVI.—Preparation of polyphenylene sulfide

Utilizing the conditions of Example XXXV, parachlorophenylene thiol is reacted with acetic anhydride to form S-acetyl chlorophenylene thiol, and this material is then polymerized under vacuum to provide polyphenylene sulfide.

It should be noted in the foregoing Examples XXXIII to XXXVI that the acetic acid and acetyl chloride recovered, respectively, during the alkanoylation and polymerization reactions can themselves be combined to provide acetic anhydride, with hydrogen chloride being driven off. It will thus be appreciated that the acetic anhydride so produced can be recycled to the reaction. This provides for a continuous reaction technique and also means that the reaction consumes the phenylene or other arylene substances to provide the polymer, while the alkanoylation agent or agents are recovered.

Here again, a dihalobenzene and, for example, a diaminobenzene can be utilized to provide the polyphenylene amine.

Example XXXVII.—Formation of polyarylene thiocarbonate

S-acetyl thiobenzoic-acetic anhydride in the amount of 0.1 mole (23.8 grs.) is heated under a vacuum, gradually raising the temperature from 140° C. to 360° C. during 2 hours. The acetyl materials driven off are recovered, and polyphenylene thiocarbonate is formed.

Example XXXVIII

The procedure of Example XXXVII is repeated utilizing 0.1 mole of S,S'-diacetyl dithiobenzene and 0.1 mole of benzene dioic-acetic dianhydride to provide polyphenylene thiocarbonate.

Example XXXIX.—Preparation of polyarylene sulfide

S-acetyl thiophenyl acetate is prepared by treating meta-thiophenol with acetic anhydride in the ratio of two moles of anhydride for each mole of thiophenol. The S-acetyl acetate is then heated under reduced pressure at from 140° C. to 360° C. during 3 hours. This results in the production of polyphenylene sulfide.

The polyphenylene sulfide can also be produced by reacting S,S'-diacetyl dithiobenzene with phenylene diacetate and recovering acetic anhydride from the mixture, or by reacting S-alkanoyl chlorothiobenzene or by reacting S,S'-dialkanoyl dithiobenzene with dichlorobenzene and recovering acetyl chloride from the mixture.

What is claimed is:
1. A process for producing a solid polyarylene amide which comprises reacting at a temperature of from about 140° to about 400° C. (A) an arylene dicarboxylic acid-dialiphatic acid dianhydride and (B) an arylene diamine N,N'-aliphatic diacylate to eliminate an anhydride and form said polyarylene amide.

2. The process of claim 1 wherein the acylate radical contains from two to six carbon atoms.

3. The process of claim 1 wherein the arylene is phenylene, naphthylene, or biphenylene.

4. The process of claim 1 wherein the arylene is phenylene.

5. The process of claim 1, wherein the acylate derivatives are acetyl and the anhydride is acetic anhydride.

6. The process of claim 1 wherein the reaction is carried out at a pressure of from 3.5 mm. Hg to atmospheric.

7. The process of claim 1 wherein the dianhydride and the N-acylate are formed in situ by the reaction of, respectively, an arylene dicarboxylic acid and an arylene diamine with an acylating agent.

8. The process of claim 7 wherein the acylating agent is an alkanoic anhydride, an alkanoyl halide, or a ketene.

9. The process of claim 7 wherein the reaction to form the anhydride and N-acylate is carried out at a temperature of from 0° C. to 200° C.

10. A process for preparing a solid polyarylene amide which comprises reacting at a temperature of from about 140° to about 400° C. N-aliphatic acyl aminoarylene carboxylic-aliphatic anhydride to eliminate aliphatic anhydride and produce said polyarylene amide.

11. A process according to claim 10, wherein the aliphatic anhydride contains from two to six carbon atoms in each acyl moiety.

12. The process of claim 10, wherein the arylene is phenylene, naphthylene or biphenylene.

13. The process of claim 10, wherein the arylene is phenylene.

14. The process of claim 10, wherein the acylate derivatives are acetyl and the anhydride is acetic anhydride.

15. The process of claim 10, wherein the reaction is carried out at a pressure of from 3.5 mm. Hg to atmospheric.

16. The process of claim 10, wherein the N-aliphatic acyl aminoarylene carboxylic acid anhydride is formed in situ by the reaction of an aminoarylene carboxylic acid with an acylating agent.

17. The process of claim 16, wherein the reaction to form the N-aliphatic acyl aminoarylene carboxylic acid anhydride is carried out at a temperature of from 0° C. to 200° C.

18. The process of claim 16, wherein the acylating agent is an alkanoic anhydride, an alkanoyl halide, or a ketene.

References Cited

UNITED STATES PATENTS

| | | | |
|---|---|---|---|
| 2,130,948 | 9/1938 | Carothers | 260—78 |
| 2,277,125 | 3/1942 | Martin | 260—78 |
| 2,708,617 | 5/1955 | Magat et al. | 260—78 |
| 3,082,191 | 3/1963 | Windholz | 260—78 |
| 3,094,511 | 6/1963 | Hill et al. | 260—78 |
| 3,109,836 | 11/1963 | Berry | 260—78 |
| 3,203,933 | 8/1965 | Huffman et al. | 260—78 |
| 3,225,011 | 12/1965 | Preston et al. | 260—78 |
| 3,240,758 | 3/1966 | Smith et al. | 260—78 |
| 3,287,324 | 11/1966 | Sweeny | 260—78 |
| 3,472,819 | 10/1969 | Stephens | 260—78 |

HAROLD D. ANDERSON, Primary Examiner

U.S. Cl. X.R.

260—2 R, 47 R, 47 X, 47 C, 47 E L, 47 C Z, 77.5 D, 78 A, 79 R, 95 R